United States Patent
Ridley et al.

(10) Patent No.: US 8,484,634 B2
(45) Date of Patent: Jul. 9, 2013

(54) SYSTEM FOR SIGNALING AN APPLICATION TO A HOST DEVICE AND METHOD THEREFOR

(75) Inventors: Aidan Ridley, Arvada, CO (US); Patrick Ladd, San Marcos, CA (US); Labeeb Ismall, San Francisco, CA (US)

(73) Assignees: Time Warner Cable, Inc., New York, NY (US); Comcast Cable Holdings, LLC, Philadelphia, PA (US)

( * ) Notice: Subject to any disclaimer, the term of this patent is extended or adjusted under 35 U.S.C. 154(b) by 1079 days.

(21) Appl. No.: 12/057,419

(22) Filed: Mar. 28, 2008

(65) Prior Publication Data

US 2009/0249326 A1     Oct. 1, 2009

(51) Int. Cl.
    *G06F 9/44* (2006.01)
(52) U.S. Cl.
    USPC .......................................... 717/174; 717/121
(58) Field of Classification Search
    USPC ......................................................... 717/174
    See application file for complete search history.

(56) References Cited

U.S. PATENT DOCUMENTS

| | | | | |
|---|---|---|---|---|
| 6,487,723 | B1 * | 11/2002 | MacInnis | 725/132 |
| 7,055,169 | B2 * | 5/2006 | Delpuch et al. | 725/100 |
| 7,774,820 | B2 * | 8/2010 | Prus et al. | 725/132 |
| 7,869,369 | B2 * | 1/2011 | Overcash | 370/241 |
| 2006/0047957 | A1 * | 3/2006 | Helms et al. | 713/165 |
| 2006/0130110 | A1 * | 6/2006 | Cho et al. | 725/111 |
| 2006/0294512 | A1 | 12/2006 | Seiden | |
| 2007/0169118 | A1 * | 7/2007 | Choi | 717/174 |
| 2008/0072265 | A1 * | 3/2008 | Kim et al. | 725/105 |
| 2008/0120676 | A1 * | 5/2008 | Morad et al. | 725/127 |
| 2008/0126471 | A1 * | 5/2008 | Oh et al. | 709/201 |
| 2008/0134165 | A1 * | 6/2008 | Anderson et al. | 717/173 |
| 2008/0141327 | A1 * | 6/2008 | Oh et al. | 725/131 |
| 2008/0155615 | A1 * | 6/2008 | Craner et al. | 725/91 |

OTHER PUBLICATIONS

Digital Video Broadcasting (DVB); Multimedia Home Platform (MHP) Specification 1.2, European Broadcasting Union DVB Project (2007).*
Cable Television Laboratories, Inc.; Open Cable Application Platform Specification; OCAP 1.0 Profile; OC-SP-OCAP1.0-I16-050803, Aug. 2005.

* cited by examiner

*Primary Examiner* — Don Wong
*Assistant Examiner* — Theodore Hebert
(74) *Attorney, Agent, or Firm* — The Marbury Law Group, PLLC

(57) ABSTRACT

An application is signaled to a host device using descriptors incorporated into an application information table. Only applications intended for a certain host device are downloaded to that host device. The descriptors allow the host to identify applications that are addressed to the host based on attributes of the host. When addressing is performed at the level of an application, the application signaling is accomplished using a single application information table and the evaluation of logical parameters against selected host attributes to identify all of the applications addressed to the host. When addressing is performed at the level of a table, multiple tables are evaluated using logical parameters applied to selected host attributes to determine which table is addressed to the host. Addressing conflicts are resolved using priority measures assigned to selected host attributes.

18 Claims, 15 Drawing Sheets

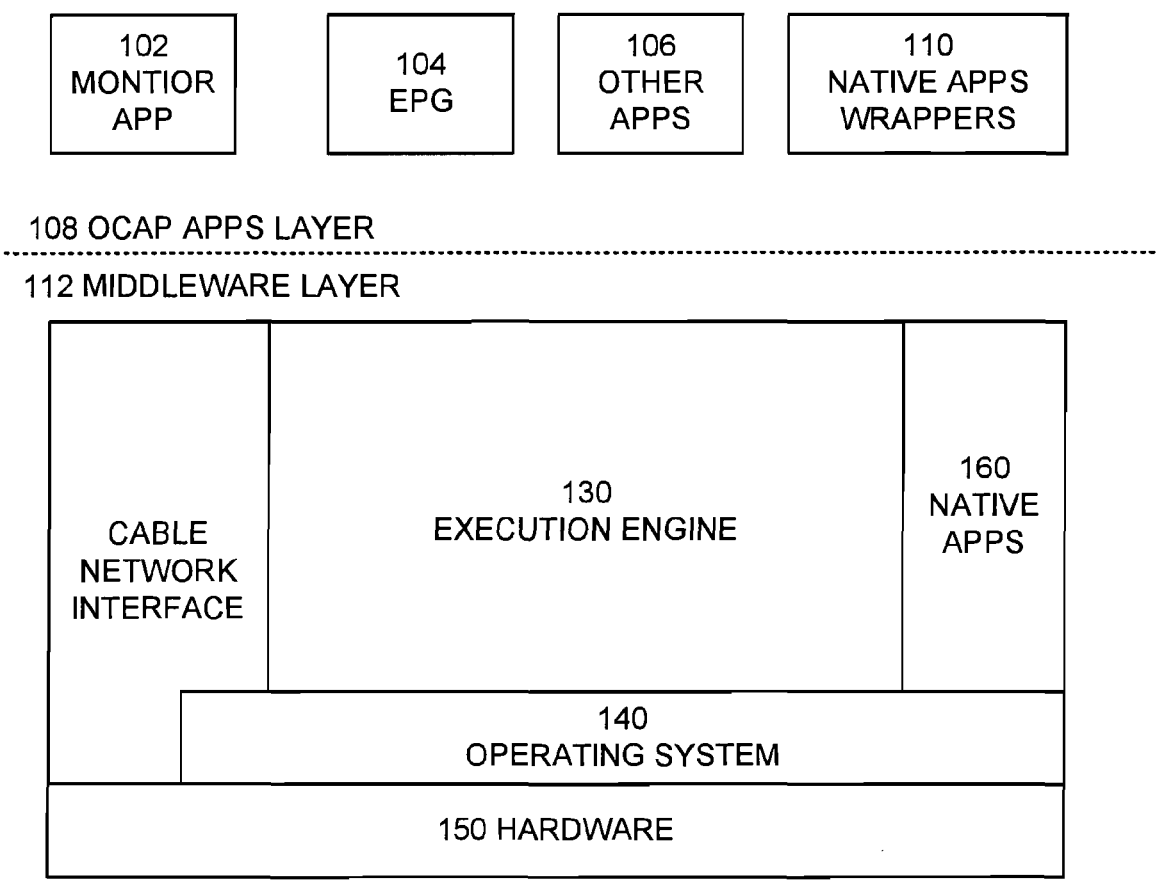

FIGURE 2
(Prior Art)

```
application_information_section () {
    table_id
    section_syntax_indicator
    section_length
    test_application_flag
    application_type version_number
    current_next_indicator
    section_number
    last_section_number               } 210 Table Data common_descriptors_length
    for (i = ; i < N; i++) {
        descriptor()                  } 220 Common Descriptor Loop application_loop_length
    for (i = ; i < N; i++) {
        application_identifier()
        application_control_code
        application_descriptors_loop_length
        for (j = ; j < N; j++) {
            descriptor()
                                      } 230 Application Descriptor Loop
```

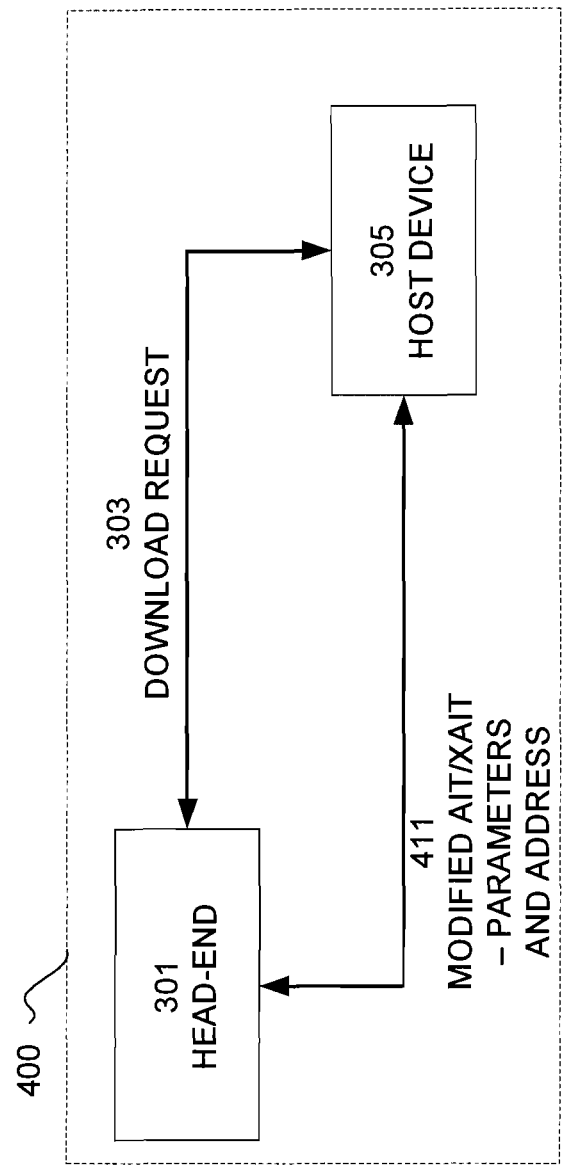

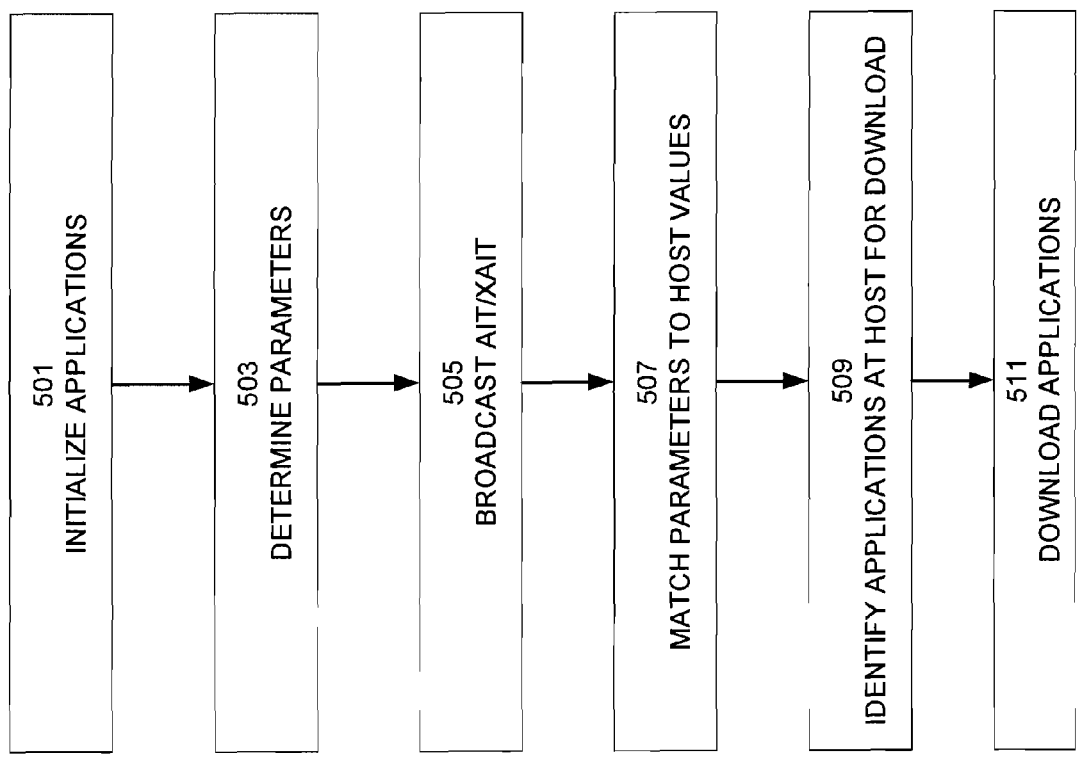

FIGURE 6

```
application_information_section () {
    table_id
    section_syntax_indicator
    section_length
    test_application_flag
    application_type
    version_number
    current_next_indicator
    section_number
    last_section_number                          ⎬ 210 Table Data common_descriptors_length
    for (i = ; i < N; i++) {
        descriptor()
    }
    addressing_descriptor  ⎬ 605 Addressing Descriptor
                                                 ⎬ 200 Common Descriptor Loop application_loop_length
    for (i = ; i < N; i++) {
        application_identifier()
        application_control_code
        application_descriptors_loop_length
        for (j = ; j < N; j++) {
            addressable_application_descriptor()  ⎬ 625 Addressable Application Descriptor
        }
    }                                            ⎬ 230 Application Descriptor Loop
}
```

FIGURE 7

710 addressing descriptor()
{

720 descriptor tag 730 descriptor length 735 group identifier 740 address label

750 Priority 760 for( i=0; i<N; i++)

770 {address expression}}

FIGURE 8 host device attribute comparison()

820 {op code 830 attribute id 840 attribute value length 850 for (i=0; i<N; i++)

855 {attribute value char}}

FIGURE 9

| Attribute | Description |
|---|---|
| 905 Hub ID | Uniquely identifies a group of host devices that are served by the same hub and are typically in a geographically contiguous area. |
| 910 Unique Host Id | The unique host device id string. |
| 915 CableCard Manufacturer | The numeric CableCard manufacture id |
| 920 CableCard version number | The numeric CableCard version number |
| 923 Cable Card MAC address | A unique hardware identifier for the cable card. |
| 925 Host Hardware Vendor Id | The numeric hardware vendor id |
| 930 Host Hardware Version Id | The numeric hardware version id |
| 935 Host Serial Number | The host device serial number string |
| 940 Support for High Def | Indicates that the host device has support for high def video. |
| 945 Support for DVR | Indicates that the host device has support for DVR. |
| 950 OCAP Version | String representation of the OCAP DVR API version number. |
| 955 OCAP profile | The ocap.profile system property |

FIGURE 10

```
assignable attribute comparison() {

1010 op code 1020 attribute name length 1030 for(i=0; i<N; i++) {

1040 attribute name char
    }
    1050 attribute value length 1060 for(i=0; i<N; i++) {

1070 attribute value char
    }
```

FIGURE 11 addressable application descriptor() {

1110 descriptor tag 1115 descriptor length 1120 application profiles length 1125 for( i=0; i<N; i++) {

1130 application profile 1135 version.major 1140 version.minor 1145 version.micro
    }

1150 service bound flag 1155 visibility 1165 application priority 1170 address labels length 1175 For( i=0; i<n; i++) {

1180 address label
    }
    1185 for( i=0; I<N; i++) {

1190 transport protocol label
    }

FIGURE 12

```
application_information_section () {
    table_id
    section_syntax_indicator
    section_length
    test_application_flag
    application_type
    version_number
    current_next_indicator
    section_number
    last_section_number
                                                    } 210
                                                      Table Data common_descriptors_length
    for (i = ; i < N; i++) {
        descriptor()
                                                    } 200
        addressing_descriptor    } 1205              Common
                                   Addressing       Descriptor
                                   Descriptor       Loop application_loop_length
    for (i = ; i < N; i++) {
        application_identifier()
        application_control_code                    } 230
        application_descriptors_loop_length           Application
        for (j = ; j < N; j++) {                      Descriptor
            descriptor()                              Loop
        }
    }
}
```

FIGURE 13

1310 ADDRESSING DESCRIPTOR()
{

1320 DESCRIPTOR TAG

1330 DESCRIPTOR LENGTH

1360 FOR( I=0; I<N; I++)

1365 ATTRIBUTE ID

1370 ATTRIBUTE VALUE

FIGURE 14

| Attribute | Priority | Description |
|---|---|---|
| 1405 Hub ID | 2 | Uniquely identifies a group of host devices that are served by the same hub and are typically in a geographically contiguous area. |
| 1410 Unique Host Id | 3 | The unique host device id string. |
| 1415 CableCard Manufacturer | 3 | The numeric CableCard manufacture id |
| 1420 CableCard version number | 4 | The numeric CableCard version number |
| 1423 Cable Card MAC address | 4 | A unique hardware identifier for the cable card. |
| 1425 Host Hardware Vendor Id | 3 | The numeric hardware vendor id |
| 1430 Host Hardware Version Id | 3 | The numeric hardware version id |
| 1435 Host Serial Number | 4 | The host device serial number string |
| 1440 Support for High Def | 1 | Indicates that the host device has support for high def video. |
| 1445 Support for DVR | 1 | Indicates that the host device has support for DVR. |
| 1450 OCAP Version | 1 | String representation of the OCAP DVR API version number. |
| 1455 OCAP profile | 1 | The ocap.profile system property |
| 1460 Default | 0 | To be used if no more selective criteria are apply to the device |

SYSTEM FOR SIGNALING AN APPLICATION TO A HOST DEVICE AND METHOD THEREFOR

BACKGROUND AND SUMMARY

Note that in the disclosure that follows, that DOCSIS®, eDOCSIS™, PacketCable™, CableHome®, CableOffice™, OpenCable™, CableCARD™, DCAS™, and CableLabs® are trademarks of Cable Television Laboratories, Inc.

For decades, cable companies, network programmers, consumer electronics companies and computer software makers have sought to deploy interactive TV services on a large scale. Many of their efforts have borne fruit with new interactive games, news and local information, sports statistics, advertising, shopping, program guides, music, polling, banking and other television enhancements.

The development of interactive services is a costly undertaking. One obstacle to mass market deployment of these services was the prospect of having to write and maintain applications for platforms of multiple vendors. What was needed was a set of standards to assure that an interactive application that would run on one particular make of set-top box, middleware platform or digital device would also run on products of other manufacturers.

The OpenCable Application Platform, or OCAP, provides an operating system layer designed for interaction with consumer electronics connected to a cable television network. More specifically, OCAP defines a middleware layer that enables interactive television application developers to produce a single product that is compatible with any cable television system in North America that implements OCAP, independent of the manufacturer or operating system of the set-top device.

One feature explicitly outlined in OpenCable Application Platform Specification (OCAP) 1.0 Profile (OC-SP-OCAP1.0-116-050803) (herein, the OCAP Specification; the OCAP Specification is incorporated herein for all purposes) is the Application Information Table, or AIT. The AIT is developed at a head-end device, or distributor of streaming data, typically by a programmer producing the applications or an administrator overseeing the distribution of the applications. The AIT includes information for instructing a receiving set-top device as to the applications that are currently available and associated with the current broadcast stream and how to start them, as well as additional information for both the set-top device and the user of the device. Common examples of applications include interactive games, sports statistics, home shopping and banking. Related to the AIT is the Extended Application Information Table, or the XAIT. This table provides information about "unbound" applications which are not associated with the currently presenting broadcast service and may be run at any time. Common examples include an interactive program guide and customer care applications.

FIG. 1 illustrates an OCAP host stack as known in the art. The OCAP application layer 108 comprises monitor application 102, electronic program guide application 104, wrappers for native applications 110, and other applications 106.

The OCAP middleware layer 112 comprises software that operates between OCAP applications and the operating system 140 of an OCAP host device (such as a set top box, a DVR, a cable card). The job of the middleware layer 112 is to translate what lies at the root level for what sits above it—so that, say, an interactive trigger from a programmer does not need to know what version of OS is being used in a particular OCAP host device. The software modules (not illustrated) of middleware level 112 run on a JAVA execution engine 130. Native applications 160 may also be executed by execution engine 130 provided a JAVA wrapper 110 is provided.

For example, the middleware helps an interactive game to run on a cable set-top box, or an "interactive digital cable ready" device, and interact with a cable system. When OCAP-compliant middleware is in those devices (i.e., OCAP host devices), then developers can be reasonably assured that their OCAP-based programs will run on those devices. In this way, OCAP creates a means to establish a standardized, international platform to launch all sorts of interactive services on all sorts of digital devices.

Before an OCAP host device can actually run an application, several things have to happen. First of all, the OCAP host device has to "know" that the application actually exists. Second, it has to "know" that the user is allowed to run it at the current time. Finally, it has to be able to access everything that it actually needs to run the application, such as class files and data files or assets.

Every application is associated with a service (either an actual service or an abstract service). The lifecycle of an application is intimately connected with the service to which it is associated. For example, a video receiver that is tuned to a channel is using the "services" associated with that programming. When the viewer changes channel, any applications that are associated with the previous channel may be terminated and new applications will be downloaded and operated. Thus, OCAP restricts the applications that can run at any one time to those that the broadcaster has decided are relevant to what the viewer is currently watching.

Although OCAP applications are usually associated with a broadcast service, it is possible to download OCAP applications and store them in the receiver for use later. Even these applications are part of a service, albeit an abstract service that is only used for grouping applications.

A service in digital TV terminology means a single collection of service information, video and audio streams that can be presented together as a coherent entity. One TV channel (e.g. CNN or BBC) is a service. Services may have more than one audio or video stream, and the receiver will choose which ones to play.

Typically, all of the information about an application (even one that will be downloaded and stored for later use) will be carried within the data stream that carries the audio and video for the parent service. This information consists of two parts:
1. The files that make up the application, its assets, and its data are carried in a DSM-CC object carousel. This acts as a broadcast file system from which the receiver can read any files that it needs to run the application; and
2. The Application Information Table (AIT).

The OCAP Specification defines the service AIT. This table is broadcast for every service that contains an OCAP application, and it contains an entry for every application that is valid for that service. Thus, if a service has two applications associated with it, this table will contain two entries. The broadcast of the AIT "signals" the OCAP host device that applications exist. Other elements of the AIT allow the OCAP host device to determine whether the device is authorized to run the application.

FIG. 2 illustrates an AIT according to the OCAP 1.0 profile.

The AIT contains all the information that the OCAP host device needs to run the application and to tell the user of the OCAP host device what applications are available in a meaningful way. This includes elements such as the name of the application, the location of its files and any arguments that should be passed to the application when it starts.

The AIT contains table data 210 and two descriptor loops that describe the applications within the AIT. The common descriptor loop 220 contains descriptors that apply to all applications within the AIT, while the application descriptor loop 230 contains descriptors that apply to a particular application.

In practice, when a service change occurs, an application manager (not illustrated) in the host device examines the current set of applications. Any applications that are signaled as being service bound to the previous service are immediately terminated. The application manager examines every application that is signaled on the new service. Any applications that are signaled as auto-start are loaded and started. Any applications that were already running and are not signaled directly in the AIT are compared against the application identifiers (see FIG. 2, application descriptor loop 230) listed in the external application authorization descriptors. Any already running application that is not signaled in the AIT associated with the new service and is not listed in these descriptors is terminated.

FIG. 3 illustrates a typical OCAP environment 300. A head end device 301 supplies a data stream to a host device 305. In this illustration, the head-end device 301 creates an AIT 311 and transmits it to the host device 305. The host device 305 extracts application identifying information from the AIT 311. The host device issues a download request 303 to the head-end device 301 and downloads the identified applications from the head-end device 301.

In a typical OCAP environment, such as the one illustrated in FIG. 3, all applications are pushed to a set-top device regardless of whether the device requires the application to function. For example, if the AIT includes DVR related applications, the DVR applications will be pushed to all set-top devices regardless of whether they have DVR capabilities. As such, OCAP utilizes an "All or None" philosophy with the downloading of applications.

An OCAP host device can also run applications which are not bound to any service. In this case, information about those applications cannot be broadcast as part of a service, because the applications themselves are not part of a service. To solve this problem, OCAP defines an additional way of delivering information about applications the Extended Application Information Table (XAIT). The XAIT can be delivered to the OCAP host device in a number of ways known in the art. The XAIT contains information about unbound applications, such as the monitor application and the electronic program guide, in a manner similar to that used by the AIT.

A similar architecture is reflected in the Digital Video Broadcasting (DVB) standards and utilized by a DVB host device to perform the same functions as the OCAP host device. In the description that follows, the term "host device" encompasses both an OCAP host device and a DVB host device.

Currently, when a host device processes the AIT and the XAIT, it must load all signaled applications listed in the AIT or XAIT. There are many situations, however, in which it is desirable to run different bound and unbound applications on different hosts on the same network. An MSO might have different versions of an EPG application for DVR and non-DVR hosts. There might be discrepancies in the behavior of a particular type of host device that at least temporarily requires the MSO to run a different version of the application on that type of device. During upgrades, an MSO may want to test a new version of an application on a small number of host devices before deploying the new version to all customers. In a development environment multiple developers on the same network may want to run different applications. In all of these cases, it is desirable to signal a different set of applications to different host devices.

For example, a MSO has a single application that provides electronic program guide (EPG) and monitor functionality. A new version of this application has been tested and is ready to deploy. In order to minimize risk, each cable system within the MSO would benefit from a step wise deployment with the following phases:

(1) a few host devices in the headend;
(2) 10s of host devices that belong to friendly employees;
(3) 100s of host devices on a particular hub; and
(4) System wide deployment.

As another example, a development lab has several developers working on the same application and each developer wants to run his or her own version of the application to test the changes that they are making.

As the examples discussed above illustrate, the present OCAP application downloading system is deficient in several ways. First, the downloading system wastes processor resources at user set-top devices. There are limited processing resources at each device, and downloading unnecessary applications wastes these resources. Likewise, pushing all applications to each set-top device inefficiently consumes valuable and limited storage at each device. Storing unnecessary applications on a device that will not be able to use them is therefore inefficient.

What is needed is a system and method of OCAP application downloading where the applications are targeting for each individual set-top device based upon parameters unique to the set-top devices themselves which define the needs/requirements/desires of the set-top devices

DESCRIPTION OF THE FIGURES

FIG. 1 illustrates an OCAP host stack as known in the art.

FIG. 2 illustrates a known structure of an extended application information table (XAIT) as known in the prior art.

FIG. 4 is a block diagram illustrating an OCAP environment according to an embodiment hereof.

FIG. 5 illustrates a flow by which a specific application may be addressed to a host device according to an embodiment hereof.

FIG. 6 illustrates a structure of an extended application information table (XAIT) according to an embodiment hereof.

FIG. 7 illustrates the elements of an exemplary addressing descriptor according to an embodiment hereof.

FIG. 8 illustrates the elements of an exemplary host device attribute comparison operation according to an embodiment hereof.

FIG. 9 illustrates elements of exemplary valid attributes according to an embodiment hereof.

FIG. 10 illustrates the elements of an exemplary host device assignable attribute comparison operation according to an embodiment hereof.

FIG. 11 illustrates the elements of an exemplary addressable application descriptor according to an embodiment hereof.

FIG. 12 illustrates a structure of an extended application information table (XAIT) according to an embodiment hereof.

FIG. 13 illustrates the elements of an exemplary addressing descriptor according to an embodiment hereof.

FIG. 14 illustrates elements of exemplary valid attributes according to an embodiment.

DETAILED DESCRIPTION

Figure 3:
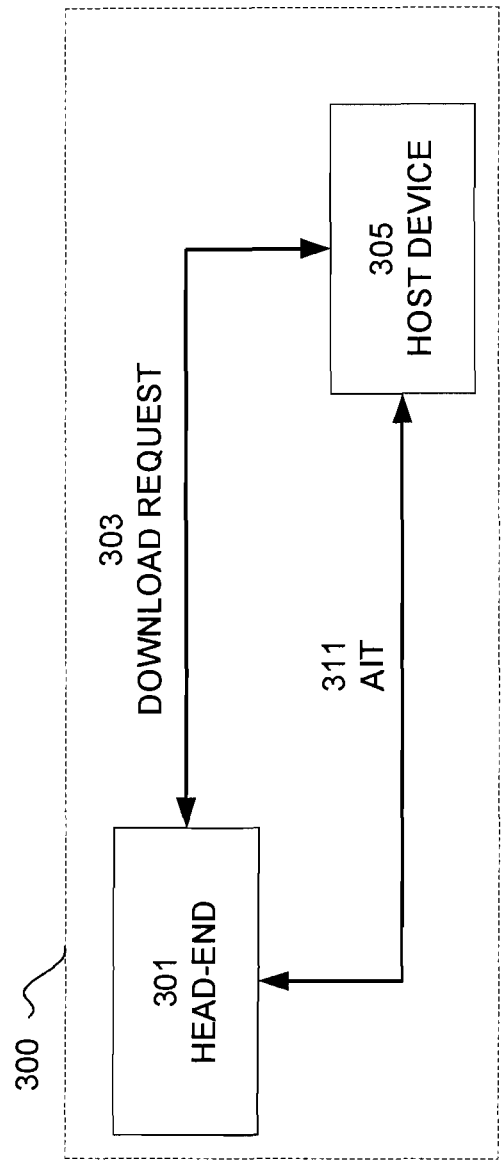
FIG. 3 is a block diagram illustrating a typical OCAP environment as known in the prior art.

In the description that follows, embodiments are described in the context of an Application Information Table (AIT) or an Extended Application Information Table (XAIT). However, the application is not so limited. Unless a distinction between the AIT and the XAIT is clear from the context of the description, discussion relating to one of these tables also relates to the other.

In an embodiment, addressing at the level of the application is performed. In this embodiment, a single addressable AIT (AAIT) is broadcast on the network. The AAIT is extended to permit (but not require) inclusion of descriptors that associate a set of applications with a set of host devices. The descriptors determine which of those particular applications that a particular host may operate. This determination is based on two descriptors, the addressing descriptor and the addressable application descriptor. The addressing descriptor is used by a host device to determine what applications are addressed to it. The addressable application descriptor associates an application with an identifier that is used to link the addressable application descriptor to an addressing descriptor. Thus, only applications defined by a service provider as intended for a certain host device are downloaded to that host device.

In another embodiment, a head-end identifies parameters required for one or more applications, the application parameters including all necessary functionality a host device requires to run the one or more applications. In response to the head-end device providing required parameters, the host device retrieves host device parameters, which reflect the host device itself. The application and host device parameters are compared by the host device. The host device then downloads an application if the host parameters match the application parameters.

In an embodiment, the host device is a data receiving device on an OCAP network. It should be understood, however, that this is merely for illustrative purposes and that a host device can be any data receiving device on any data network.

Preferably, once the parameters and required values of the individual applications are established at the head-end device, the head-end modifies the AIT/XAIT to include the parameters and required values. By comparing the parameter values of each host device against the Boolean expressions contained in the AIT/XAIT, and only downloading applications to host devices that satisfy the Boolean expressions, the present invention achieves targeted downloading of the applications.

FIG. 4 illustrates an OCAP environment 400 reflecting a modified AIT/XAIT according to an embodiment. FIG. 5 illustrates a flowchart of a process by which a host device receives an application according to an embodiment.

Referring to both FIGS. 4 and 5, the head-end device (FIG. 4, 301) or, more specifically, a user or an administrator at the head-end device, prepares to initialize a set of applications for downloading to a group of host devices (FIG. 5, 501). During this process, new applications are sent to the head-end device for distribution by a programmer or administrator.

The programmer or administrator determines the required parameters and required values for each application (FIG. 5, 503). As discussed above, the listing of parameters varies from one application to another. For example, if an updated DVR application is being considered to be pushed to a group of host devices manufactured by Motorola®, a sample set of parameters and values may include: (a) a user is subscribed to a premium level of service including DVR service; (b) the user's host device has DVR capabilities (e.g., a hard drive and video capture device for recording and storing streaming data); and (c) the user's device was manufactured by Motorola®. These three parameters and values are formed into a Boolean expression and appended to the AIT/XAIT entries for this application. An example of such a Boolean expression is as follows:

<service==premium AND device==DVR AND manufacturer==Motorola®>.

Once this expression is determined, it is appended to the AIT/XAIT entries to create modified AIT/XAIT (FIG. 4, 411). The head-end device also appends an address indicator to the entry. This address is used by host devices that satisfy the requirements for a particular application to facilitate downloading the particular application.

The modified AIT/XAIT information is broadcast to each host device (FIG. 5, 505). The host device receives the modified AIT/XAIT information and determines a single listing of parameters and values required to satisfy the parameters for each application. This single listing of parameters and required values for each application are specific to each application and includes only the parameters and required values for that application along with the address of that application. Continuing the above example, a possible listing is as follows:

<service= =premium
device= =DVR
manufacturer= =Motorola ®
address_label>

The host device determines whether the attributes of the host device match the parameters contained in the AIT/XAIT listings (FIG. 5, 507). Stored on the host device is a listing of the host device's attribute values (not illustrated). This listing of host attribute values can be updated according to a predetermined schedule (e.g., every Sunday at midnight) to reflect any recent user initiated changes to the host device (e.g., how much memory is being used to store programs recorded by the DVR), or a request to update the user parameter values can be made by a service provider when a non-user initiated change is made to the host device itself (e.g., a change in level of service).

Once the host device receives the individual application parameters and required values, the host device compares the application's parameters and required values to the host's operating attributes and attribute values (FIG. 5, 507). Several parameters have a one-to-one correlating value, such as Manufacturer or DVR capabilities. Other parameters establish a threshold value which a user parameter value should meet or exceed, such as processor speed or level of service.

Continuing the above example, the parameters for the application include Manufacturer, DVR, and Level of Service. The Manufacturer parameter has one correlating value that will satisfy the parameter, i.e., Motorola®. Similarly, the DVR parameter has one correlating value, i.e., Yes (indicating the host device is equipped with DVR capabilities). The Level of Service parameter, however, has a minimum threshold value that should be met by the host device. In the above example, Premium is established as the minimum acceptable value for satisfying the Level of Service parameter. However, there could be values above Premium, such as Ultimate, which would still satisfy the minimum threshold value of the Level of Service parameter.

Each application that has parameters that match with the host device parameters is identified (FIG. 5, 509) and downloaded to the host device (FIG. 5, 511). For each downloadable application, the host device utilizes the address information to download the application directly from the head-end device. For each application contained in the AIT/XAIT, an identifier is included which indicates the address information of each application. If after the comparison of a particular application it is determined the particular application is intended for a host device, the host device utilizes the address information to obtain the application. Once the host device has evaluated the listing for each application, and downloaded any appropriate applications, the host device waits until new or updated applications are initialized at the head-end device (FIG. 4, 301).

It should be appreciated that the process is segregated into these process steps for illustrative purposes and the invention is not limited by the categorization of these steps. For example, one step could be divided into separate steps or one or more steps may be combined into a single step. Additionally, unless otherwise stated, the sequence of these steps may be altered.

FIG. 6 illustrates an addressable AIT (AAIT) according to an embodiment hereof. The AAIT illustrated in FIG. 6 adds one or more optional addressing descriptors 605 to the common descriptor loop 200. The AAIT also comprises an application loop 230. The application loop 230 comprises an addressable application descriptor 625. The addressing descriptor 605 and the addressable application descriptor 625 operate together to provide software download signaling that is directed to a specific device, class of devices, group of devices, or devices identifiable by common attributes. The addressing descriptor 605 is used by a host device to determine what applications are addressed to it. The addressable application descriptor 625 associates an application with an identifier (see FIG. 7, address label 740) that is used to link the addressable application descriptor to an addressing descriptor.

FIG. 7 illustrates the elements of an exemplary addressing descriptor according to an embodiment hereof.

Descriptor tag 720 is an identifier for an addressing descriptor (FIG. 10, 1005). Descriptor length 730 establishes the length of the descriptor.

Group identifier 735 is used is used to group a set of addressing descriptors from which the host device chooses the one with the highest priority (priority field 750 is described below) among those with addressing expressions that evaluate to true for the host device.

Address label 740 is a numeric identifier for this addressing descriptor. The address label 740 is referenced by addressable application descriptors associated with individual applications.

The priority field 750 is used to resolve addressing when a host device matches more than one addressing descriptor within a group. In this situation the addressing descriptor with the highest priority is used. If a host device matches multiple addressing descriptor(s) with the same priority the host device may use any one of them. A low priority addressing descriptor that evaluates to true for all host devices can be used to specify the default application that will run on host devices that do not match any more specific higher priority addressing descriptors.

The address expression 770 is a Boolean expression based on various static and assignable attributes of the host device. It is expressed as a series of Boolean stack operations. When this expression evaluates to "true" the addressing descriptor matches the host device. For example, an AND operator would be used to address all devices for a particular host device manufacturer on a specific hub. Other Boolean operators may be used to specify which host device is, or devices are, to operate a particular application or group of applications. For example, an expression with a single TRUE operation would match all host devices.

The host device attribute comparison operation compares the value of a host device attribute with a constant in the instruction in accordance with a logical expression (e.g., equal to, greater than, less than). If the expression evaluates as "true" then "true" is pushed onto the stack. If the expression evaluates as "false," then the value "false" is pushed onto the stack.

Zero or more addressing descriptor(s) (FIG. 6, 605) may appear in the common descriptor loop (FIG. 6, 200) of any section in an AAIT. When the addressing expression in an addressing descriptor evaluates to true, the host device "matches" that addressing descriptor. When a host device "matches" multiple addressing descriptor(s) within the same group ID the host device chooses the addressing descriptor with the highest priority as described below. The host device then accepts signaling for any applications with an addressable application descriptor (FIG. 6, 625) in the application loop of the AAIT (FIG. 6, 220) that references this "address" with an address label (FIG. 7, 740). Addressable application descriptor(s) (FIG. 6, 625) may refer to addressing descriptors (FIG. 6, 605) that are defined in any section of the AAIT.

FIG. 8 illustrates the elements of an exemplary host device attribute comparison operation. The operation code 820 determines the type of comparison to be done. For example, an attribute may be required to be less than, less than or equal to, equal to, greater than or equal to, or greater than an attribute value. Not all comparison types are valid for each attribute type. For example, a cable card MAC address attribute inherently must match an attribute value. In an embodiment, if an invalid comparison type is signaled the comparison is evaluated as false.

The attribute identifier 830 identifies the attribute that is being compared and determines the format of the attribute value. The host device attributes may utilize strings or binary numbers to identify the host device attributes that are being used in an addressing expression. Where a string is used, the string may take the form of a pre-defined attribute and a custom token.

Attribute value character 855 is a string representation of the attribute value. An exemplary format is specified in the host device attribute table. Some host device attributes can be represented as strings only. Others can be represented with Boolean or integer values.

FIG. 9 illustrates elements of exemplary valid attributes according to an embodiment. Hub ID 905 uniquely identifies a group of host devices that are served by the same hub and are typically in a geographically contiguous area. Unique host device identifier string 910 identifies the host device using an assigned identifier. Cablecard manufacturer 915 and cablecard version 920 identify the cablecard using attributes that allow groups of cablecards to be identified. Cablecard MAC address 923 allows cablecards to be identified individually. Host hardware version identifier 930, host serial number 935, support for high definition 940, and support for DVR 945 allow signaling of hosts based on functional attributes of the host. OCAP version 950 and OCAP profile 955 allow signaling based on OCAP attributes.

The attributes set forth in FIG. 9 are exemplary and not limiting. As will be apparent to one of ordinary skill in the art, other attributes may be used to signal a device or group of devices.

As previously described, the addressing descriptor (FIG. 6, 605) is used by a host device to identify applications that are addressed to that host device. The addressing descriptor (FIG. 6, 605) comprises an address label (FIG. 7, 740) that identifies an application that is to be signaled by the host device.

In an embodiment, a set of name/value strings (assignable attributes) are downloaded to a host device. FIG. 10 illustrates the elements of an exemplary host device assignable attribute comparison operation.

The operation code 1010 determines the type of comparison to be done. For example, an attribute may be required to be less than, less than or equal to, equal to, greater than or equal to, or greater than an attribute value. Not all comparison types are valid for each attribute type. For example, a cable card MAC address attribute inherently must match an attribute value. In an embodiment, if an invalid comparison type is signaled the comparison is evaluated as false.

The attribute name length identifies the number of bytes in the attribute name character for the loop 1030. The attribute name character 1040 is the name assigned to the attribute. The attribute value length 650 identifies the number of bytes in attribute value character for loop 1060. Attribute value character 1070 is the value of the attribute to be compared and determines the format of the attribute value.

The assignable attribute comparison operation compares the values of assignable attributes 1040 to a constant value in the instruction. If the named attribute is defined and has a value equal to the constant in the instruction, then "true" is pushed onto the stack. If the attribute is not defined, or has a valued not equal to the constant in the instruction then "false" is pushed on to the stack.

In an embodiment, assignable user/application parameters are used to define both the functional capability of a host as well as the requirements of an individual application. Example parameters include: level of service (the level of service a user has subscribed to, e.g., gold, platinum, ultimate; or the level can simply be represented by a number such as 1, 2, or 3), language (e.g., English, Spanish, French), geographic location (e.g., Philadelphia, New York City, Washington D.C.), manufacturer (who built the host, e.g., Motorola® and Scientific Atlanta®), model number, device capabilities (e.g., does the device have DVR, is the device configured for high definition signals), hardware resources (e.g., processor speed, memory size, hard disk space available). It should be understood that this listing is provided merely by way of example, and additional parameters may be used. Additionally, as the technology changes, additional parameters may become obvious.

At a head-end device, each application is examined and parameters for each application are established. These parameters identify various requirements of the host device, including level of service, hardware resources, manufacturer, and any other criteria deemed necessary for an application to function correctly and/or subscriber services to make the application desirable. An individual value for each parameter is also established, the value indicating what specific value of the parameter should be met to satisfy the parameter. Once the parameters and required values for an application are determined, the parameters and required values are formed, for example, into a Boolean expression and placed into the AIT/XAIT entry for that particular application.

In this particular embodiment, the head-end device is a data streaming device on an OCAP network. It should be understood, however, that this is merely for illustrative purposes and that a head-end device can be any data streaming device on any data network.

Similar to the head-end device, each host device has a listing of its operating parameters. The operating parameters at each host device includes a variable listing of values indicating specific details of the host device and the subscriber services, such as, for example, level of service, hardware resources, manufacturer, and any other parameters dictating the performance of the host device. The operating parameters and parameter values are stored at the host device.

In this particular embodiment, the host device is a data receiving device on an OCAP network. It should be understood, however, that this is merely for illustrative purposes and that a host device can be any data receiving device on any data network.

Preferably, once the parameters and required values of the individual applications are established at the head-end device, the head-end modifies the AIT/XAIT to include the parameters and required values. By comparing the parameter values of each host device against the Boolean expressions contained in the AIT/XAIT, and only downloading applications to host devices that satisfy the Boolean expressions, the present invention achieves targeted downloading of the applications.

FIG. 11 illustrates the elements of an exemplary addressable application descriptor according to an embodiment hereof.

Descriptor tag 1110 is an integer with a value that identifies a descriptor. An addressable application descriptor is identified by an assigned value.

Descriptor length 1115 identifies the number of bytes immediately following the length field.

Application profiles length 1120 indicates the length of the application profile loop in bytes.

Loop 1125 for (i=0; i<N; i++) is the application profile loop.

Application profile 1130 is an integer value that represents the application type specific profile. This value indicates that a receiver implementing one of the profiles listed in this loop is capable of executing the application.

Version.major 1135 carries the numeric value of the major sub-field of the profile version number.

Version.minor 1140 carries the numeric value of the minor sub-field of the profile version number.

Version.micro 1145 carries the numeric value of the micro sub-field of the profile version number.

Application profile 1130, Version.major 1135, Version.minor 1140, and Version.micro 1145 indicate the minimum profile on which an application will run.

Service bound flag 1150, if set to "1," indicates that an application is only associated with the current service and that the process of terminating the application starts at the beginning of the service change regardless of the contents of the destination AAIT.

Visibility 1155 specifies whether the application is suitable to be offered to the end-user to decide if the application should be launched. If visibility 1155 is set to 00, the application is neither visible to applications via an application listing API nor to users via the navigator with the exception of any error reporting or logging facility. If visibility 1155 is set to 01, the application is not visible to users but is visible to applications via an application listing API.

Application priority 1165 identifies a relative priority between the applications signaled in a particular service.

When there is more than one application with the same application identification, this priority is used to determine which application is started.

Address labels length 1170 indicate the length of the address label loop in bytes.

Loop 1175 for (i=0; I<n; i++) is the address label loop.

Address label 1180 references the address label (FIG. 7, 740) in an addressing descriptor (FIG. 6, 605) from the common descriptor loop (FIG. 6, 200) of any section in the AAIT. The value 0 indicates that an application is associated with the implicit default address that is used by any host device that does not match a higher priority addressing descriptor.

Loop 1185 for (i=0; I<N; i++) is the transport protocol label loop.

Transport protocol label 1190 specifies a transport protocol that delivers a signaled application.

In an embodiment, when a host device that supports AAIT addressing encounters an application entry with a legacy application descriptor, it treats the application descriptor as an addressable application descriptor with a single addressing label with the value 0, which associates it with the implicit default priority 0 address that is used when the host device does not match a higher priority address.

In another embodiment, in order to support backward compatibility with minimal duplication of data, an application entry may contain both an application descriptor and an addressable application descriptor. In this case all common fields in the two descriptors are expected to be the same. Alternatively, backward compatibility could be achieved by using a different table identifier for the addressable AAIT or by taking advantage of the host device AAIT error detections rules to make host devices that do not yet support addressing, skip over the addressing information. In an embodiment, to ensure that legacy host devices discard addressable AITs and XAITs, an error is introduced in a value of an application descriptor thereby forcing the table to be discarded.

In an embodiment, multiple addressable application information tables (AAITs) are used to signal applications to a host. In this embodiment, a host device examines all of the AAITs on the network and chooses the AAIT which has the most specific, that is, the highest priority, addressing descriptor values that match an attribute of the host device. The matching process is directed by logic operations specified in the addressing descriptor. If the logic operation results in a match between an AAIT and a host, the host device will then signal the applications that appear in that AAIT.

FIG. 12 illustrates a structure of an extended application information table (XAIT) according to an embodiment hereof. The AAIT comprises table data 210, an application loop 230, and a common descriptor loop 200. The AAIT illustrated in FIG. 12 adds an optional addressing descriptor 1205 to the common descriptor loop 200. The addressing descriptor 1205 is used by a host device to determine whether an AAIT includes an application addressed to that host device.

FIG. 13 illustrates the elements of an exemplary addressing descriptor according to an embodiment hereof.

Addressing descriptor 1310 comprises descriptor tag 1320, descriptor length 1330, an address loop 1360, and attribute id 1365 and attribute value field 1370. Descriptor tag 1320 is an identifier for an addressing descriptor (FIG. 12, 1205). Descriptor length 1330 establishes the length of the addressing descriptor.

The host device attribute comparison operation compares the value of a host device attribute with attribute id 1365 and the attribute value field 1370. If the values are equal then the value "true" is pushed onto the stack. If the values are not equal then the value "false" is pushed onto the stack.

FIG. 14 illustrates elements of exemplary valid attributes according to an embodiment. Hub ID 1405 uniquely identifies a group of host devices that are served by the same hub and are typically in a geographically contiguous area. Unique host device identifier string 1410 identifies the host device using an assigned identifier. Cablecard manufacturer 1415 and cablecard version 1420 identify the cablecard using attributes that allow groups of cablecards to be identified. Cablecard MAC address 1423 allows cablecards to be identified individually. Host hardware version identifier 1430, host serial number 1435, support for high definition 1440, and support for DVR 1445 allow signaling of hosts based on functional attributes of the host. OCAP version 1450 and OCAP profile 1455 allow signaling based on OCAP attributes. Default attribute 1460 is used if a host does not match any of the other attributes.

The attributes set forth in FIG. 14 are exemplary and not limiting. As will be apparent to one of ordinary skill in the art, other attributes may be used to signal a device or group of devices.

FIG. 14 also illustrates a priority that is assigned to each of the attributes.

For example, three different AAITs are provided to the host with the following addressing descriptors:

---

AAIT #1:
    <default>
AAIT #2:
    <unique host identifier = 1>
    <unique host identifier = 2>
AAIT #3:
    <host manufacturer = A>

---

A host device 1 is manufactured by manufacturer "B" and has a unique host identifier of 1. Host device 1 matches AAIT 1 and 2 (default attribute and unique host identifier=1). Referring to FIG. 14, it can be seen that AAIT2 has a higher priority (that is, matching the unique host identifier is more "specific" than matching the default attribute.) The application or applications associated with AAIT2 would be signaled by the host device.

A host device 2 is manufactured by manufacturer "A" and has a unique host identifier of 2. Host device 2 matches AAIT 1 and 2 (default and unique host identifier=1). Referring to FIG. 14, it can be seen that AAIT2 has a higher priority (that is, matching the unique host identifier is more "specific" than matching either the manufacturer attribute or the default attribute). The application or applications associated with AAIT2 would be signaled by the host device.

A host device 3 is manufactured by manufacturer "B" and has a unique host identifier of 3. Host device 3 matches only AAIT 1 (default attribute). The application or applications associated with AAIT1 would be signaled by the host device.

Figure 15A:
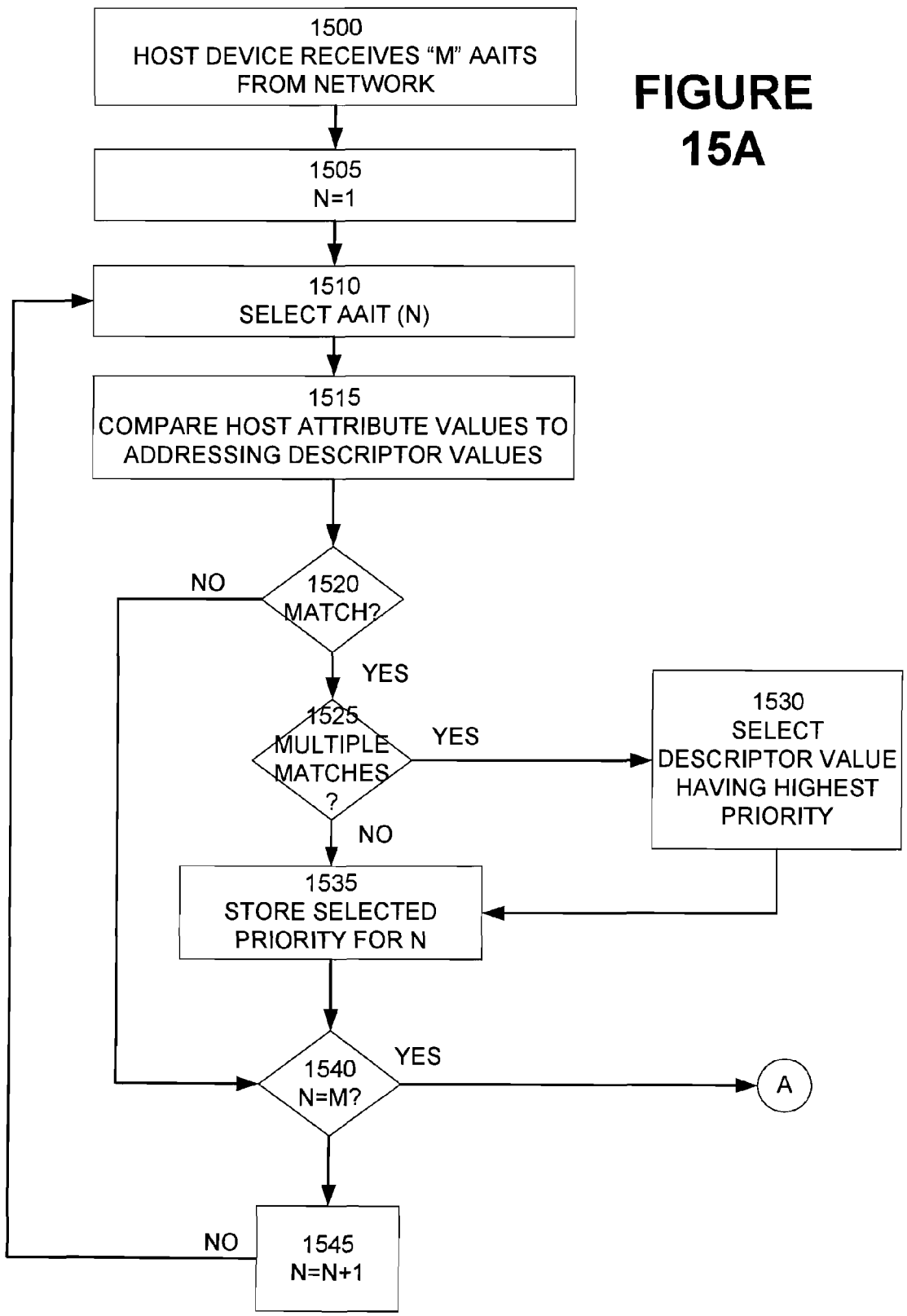
FIGS. 15A and 15B illustrate a flow by which specific applications may be addressed to a host device according to an embodiment hereof.
Figure 15B:
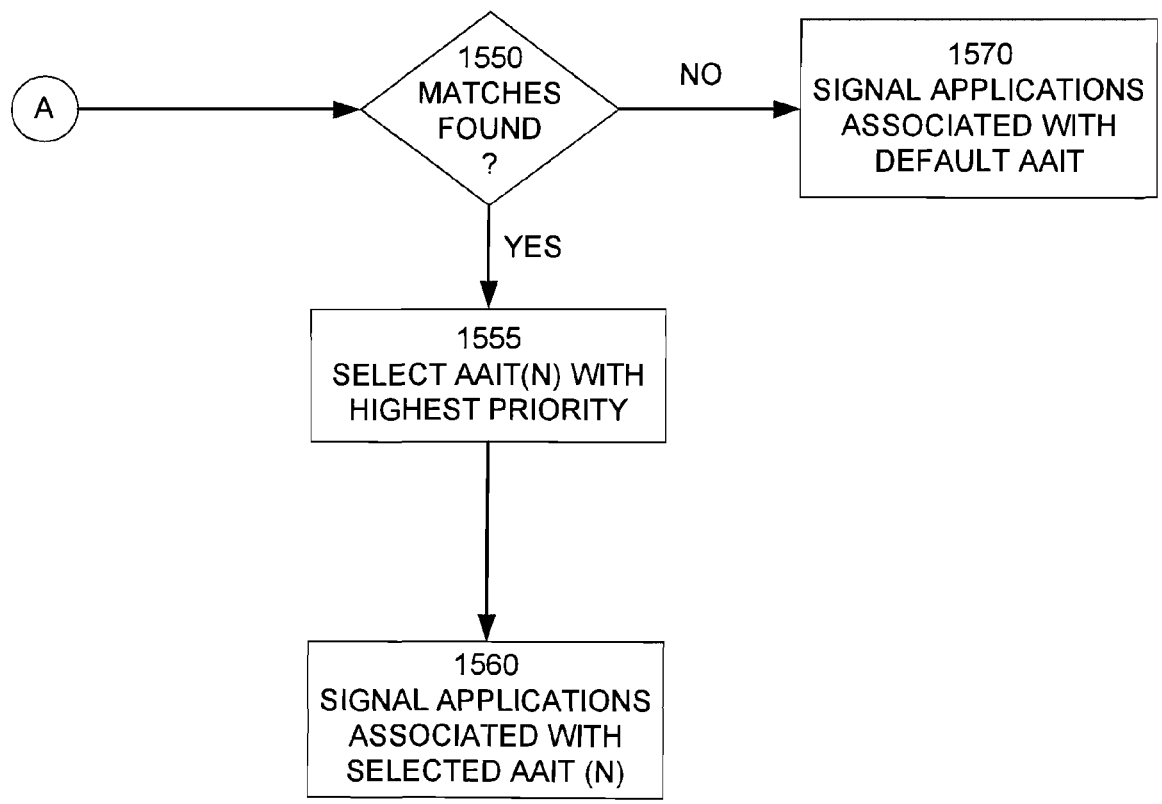

FIGS. 15A and 15B illustrate a flow by which specific applications may be addressed to a host device according to an embodiment hereof.

Referring to FIG. 15A, a host device receives "M" AAITs 1500. The host device evaluates each AAIT in a loop beginning with the first AAIT received (N=1) 1505 and 1510. The host attribute values are compared to the addressing descriptor values in the AAIT 1515.

A determination is made if the host attribute values match an addressing descriptor value 1520. If there is no match, a determination is made whether the current AAIT is the $M^{th}$ AAIT received by the host device 1540. If the current AAIT is not the M$^{th}$ AAIT, the counter "N" is incremented 1545 and the next AAIT is selected 1510.

When a match has been found 1520, a determination is made whether the host device matches more than one multiple descriptor value 1525. If the host device does not match more than one multiple descriptor value, the priority of the descriptor value that was matched is associated with AAIT "N" and stored 1535. If the host device matches more than one multiple descriptor value, the descriptor value having the highest priority is selected 1530, associated with AAIT "N" and stored 1535.

If the current AAIT is the M$^{th}$ AAIT, then referring to FIG. 15B, a determination is made whether any matches have been found 1550. A determination is made if the host attribute values match an addressing descriptor value 1520. If no matches have been found, the host device signals applications associated with the default AAIT 1570.

If a match has been found, the AAIT having the highest priority associated with the matched addressing descriptor value is selected 1555. The host device signals applications associated with the selected AAIT 1560.

It will be understood by those skilled in the art that the present invention may be, without limitation, embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular. Moreover, a reference to a specific time, time interval, and instantiation of scripts or code segments is in all respects illustrative and not limiting.

What is claimed is:

1. A method for signaling an application to a host device comprising:
    receiving at a host device an addressable application identification table (AAIT), wherein the AAIT comprises:
        a plurality of addressing descriptors that are associated with one or more applications,
            and wherein each addressing descriptor comprises an addressing expression, a group identifier, a priority value, and an address label; and
        one or more addressable application descriptors, wherein each addressable application descriptor comprises one or more address labels;
    obtaining by the host device a set of attribute values of the host device;
    for each of the plurality of addressing descriptors:
        evaluating by the host device the addressing expression of each address descriptor against the host attribute values;
        discarding the addressing descriptor when the addressing expression evaluates as false; and
        assigning the addressing descriptor to a group according to its group identifier;
    selecting from each group the addressing descriptor that has the highest priority value;
    for each of the one or more addressable application descriptors determining whether any of the one or more selected addressing descriptors comprises an address label that matches any one of the one or more address labels of the addressable application descriptor; and
    downloading each application associated with a matching address label to the host device.

2. The method of claim 1, wherein the host device is selected from the group consisting of a set top box, a DVR, a cable card, a gateway, and a computer.

3. The method for signaling an application to a host device of claim 1, wherein the set of attributes comprises at least one attribute selected from attributes that are intrinsic to the operation of the host device.

4. The method of claim 3, wherein the set of attributes comprises at least one attribute selected from the group consisting of a unique host ID, a host vendor, a host version, a host serial number, a cablecard manufacturer, a cablecard version, a cablecard MAC address, an indicator of support for high definition video streams, an indicator of support for a DVR, an OCAP version, OCAP profile, and a hub ID.

5. The method of claim 1, wherein the set of attributes comprises at least one attribute selected from attributes that are assigned to the host device.

6. The method of claim 5, wherein the set of attributes comprises at least one attribute selected from the group consisting of level of service, a user group identifier, a parameter indicative of a service, a parameter indicative of a language, and a parameter indicative of a geographic location.

7. The method of claim 1, wherein the addressing expression is expressed as a boolean stack operation selected from the group consisting of an "AND" operator, an "OR" operator, a "NOT" operator, and a comparison operator acting on a constant value.

8. A system for signaling an application over a network comprising:
    a host device connected to the network; and
    a headend device connected to the network, wherein the headend device comprises instructions for sending an addressable application identification table (AAIT) to the host device,
        wherein the AAIT comprises:
            a plurality of addressing descriptors that are associated with one or more applications, and wherein each addressing descriptor comprises an addressing expression, a group identifier, a priority value, and an address label; and
            one or more addressable application descriptors, wherein each addressable application descriptor comprises one or more address labels;
        wherein the host device comprises instructions for:
            obtaining a set of attribute values of the host;
            for each of the plurality of addressing descriptors:
                evaluating by the host device the addressing expression of each address descriptor against the host attribute values;
                discarding the addressing descriptor when the addressing expression evaluates as false; and
                assigning the addressing descriptor to a group according to its group identifier;
            selecting from each group the addressing descriptor that has the highest priority value;
            for each of the one or more addressable application descriptors determining whether any of the one or more selected addressing descriptors comprises an address label that matches any one of the one or more address labels of the addressable application descriptor; and
            downloading each application associated with a matching address label to the host device.

9. The system of claim 8, wherein the host device is selected from the group consisting of a set top box, a DVR, a cable card, a gateway, and a computer.

10. The system of claim 8, wherein the set of attributes comprises at least one attribute selected from attributes that are intrinsic to the operation of the host device.

11. The system of claim 10, wherein the set of attributes comprises at least one attribute selected from the group consisting of a unique host ID, a host vendor, a host version, a host serial number, a cablecard manufacturer, a cablecard version, a cablecard MAC address, an indicator of support for high definition video streams, an indicator of support for a DVR, an OCAP version, OCAP profile, and a hub ID.

12. The system of claim 8, wherein the set of attributes comprises at least one attribute selected from attributes that are assigned to the host device.

13. The system of claim 12, wherein the set of attributes comprises at least one attribute selected from the group consisting of level of service, a user group identifier, a parameter indicative of a service, a parameter indicative of a language, and a parameter indicative of a geographic location.

14. The system of claim 8, wherein the addressing expression is expressed as a boolean stack operation selected from the group consisting of an "AND" operator, an "OR" operator, a "NOT" operator, and a comparison operator acting on a constant value.

15. A method for signaling an application to a host device comprising:
sending a first addressable application identification table (AAIT) and a second AAIT to the host device, wherein the first and second AAIT each comprises:
a plurality of addressing descriptors that are associated with one or more applications,
and wherein each addressing descriptor comprises an addressing expression, a group identifier, a priority value, and an address label; and
one or more addressable application descriptors, wherein each addressable application descriptor comprises one or more address labels;
obtaining by the host device a set of attribute values of the host device; for each of the plurality of addressing descriptors of the first AAIT:
evaluating by the host device the addressing expression of each address descriptor against the host attribute values;
discarding the addressing descriptor when the addressing expression evaluates as false; and
assigning the addressing descriptor to one of a set of groups according to its group identifier;
for each of the plurality of addressing descriptors of the second AAIT:
evaluating by the host device the addressing expression of each address descriptor against the host attribute values;
discarding the addressing descriptor when the addressing expression evaluates as false; and
assigning the addressing descriptor to one of the set of groups according to its group identifier;
selecting from each of the groups of the set of groups the addressing descriptor that has the highest priority value;
for each of the one or more addressable application descriptors of the first and second AAITs, determining whether any of the one or more selected addressing descriptors comprises an address label that matches any one of the one or more address labels of the addressable application descriptor; and
downloading the applications associated with the matching address label to the host device.

16. The method of claim 15, wherein the set of attributes comprises at least one attribute selected from the group consisting of an OCAP profile, an OCAP version, support for DVR, support for high definition television, a host serial number, a host hardware version ID, a host hardware vendor ID, a cablecard MAC address, a cablecard version number, a cablecard manufacturer, a unique host ID, and a hub ID.

17. A system for signaling an application over a network comprising:
a host device connected to the network; and
a headend device connected to the network, wherein the headend device comprises instructions for sending a first addressable application identification table (AAIT) and a second AAIT to the host device, wherein the first and second AAITs each comprises:
a plurality of addressing descriptors that are associated with one or more applications,
and wherein each addressing descriptor comprises an addressing expression, a
group identifier, a priority value, and an address label; and
one or more addressable application descriptors, wherein each addressable application descriptor comprises one or more address labels;
wherein the host device comprises instructions for:
obtaining a set of attribute values of the host;
for each of the plurality of addressing descriptors of the first AAIT:
evaluating by the host device the addressing expression of each address descriptor against the host attribute values;
discarding the addressing descriptor when the addressing expression evaluates as false; and
assigning the addressing descriptor to a group according to its group identifier;
for each of the plurality of addressing descriptors of the second AAIT:
evaluating by the host device the addressing expression of each address descriptor against the host attribute values;
discarding the addressing descriptor when the addressing expression evaluates as false; and
assigning the addressing descriptor to one of the set of groups according to its group identifier;
selecting from each of the groups of the set of groups the addressing descriptor that has the highest priority value;
for each of the one or more addressable application descriptors of the first and second AAITs, determining whether any of the one or more selected addressing descriptors comprises an address label that matches any one of the one or more address labels of the addressable application descriptor; and
downloading the applications associated with the matching address label to the host device.

18. The system of claim 17, wherein the set of attributes comprises at least one attribute selected from the group consisting of an OCAP profile, an OCAP version, support for DVR, support for high definition television, a host serial number, a host hardware version ID, a host hardware vendor ID, a cablecard MAC address, a cablecard version number, a cablecard manufacturer, a unique host ID, and a hub ID.

* * * * *

UNITED STATES PATENT AND TRADEMARK OFFICE
CERTIFICATE OF CORRECTION

PATENT NO. : 8,484,634 B2  
APPLICATION NO. : 12/057419  
DATED : July 9, 2013  
INVENTOR(S) : Aidan Ridley, Patrick Ladd and Labeeb Ismail It is certified that error appears in the above-identified patent and that said Letters Patent is hereby corrected as shown below:

On the Title Page, item (73) Assignees

Please delete "Time Warner Cable, Inc." and insert --Time Warner Cable Enterprises LLC--

Signed and Sealed this
Twenty-first Day of July, 2015

Michelle K. Lee
*Director of the United States Patent and Trademark Office*